Oct. 16, 1951     A. G. SWENSON     2,571,782
COOKER
Filed May 25, 1946     2 SHEETS—SHEET 1
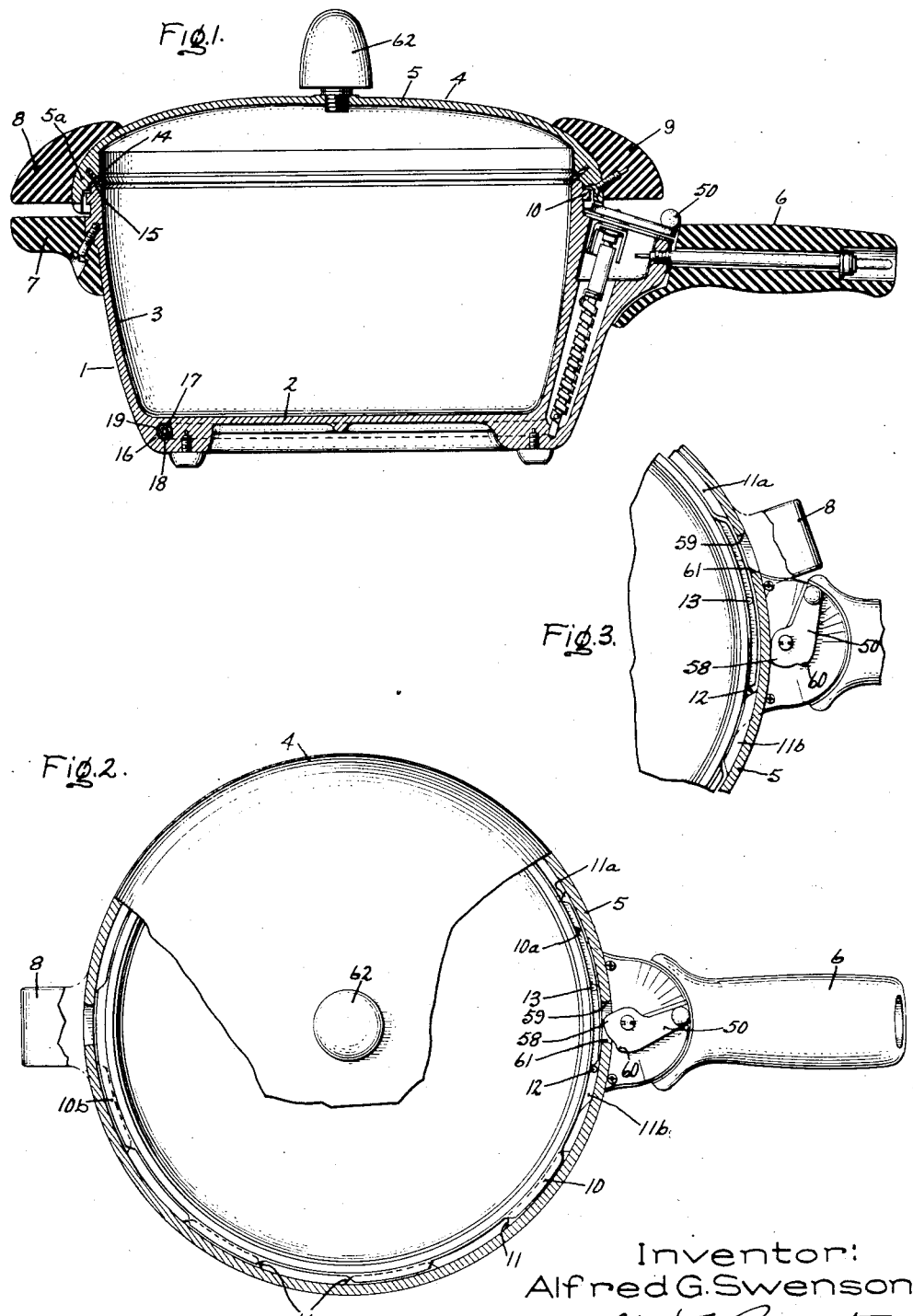
Inventor:
Alfred G. Swenson,
by Alfred V. Bobst
His Attorney.

Oct. 16, 1951  A. G. SWENSON  2,571,782
COOKER
Filed May 25, 1946  2 SHEETS—SHEET 2
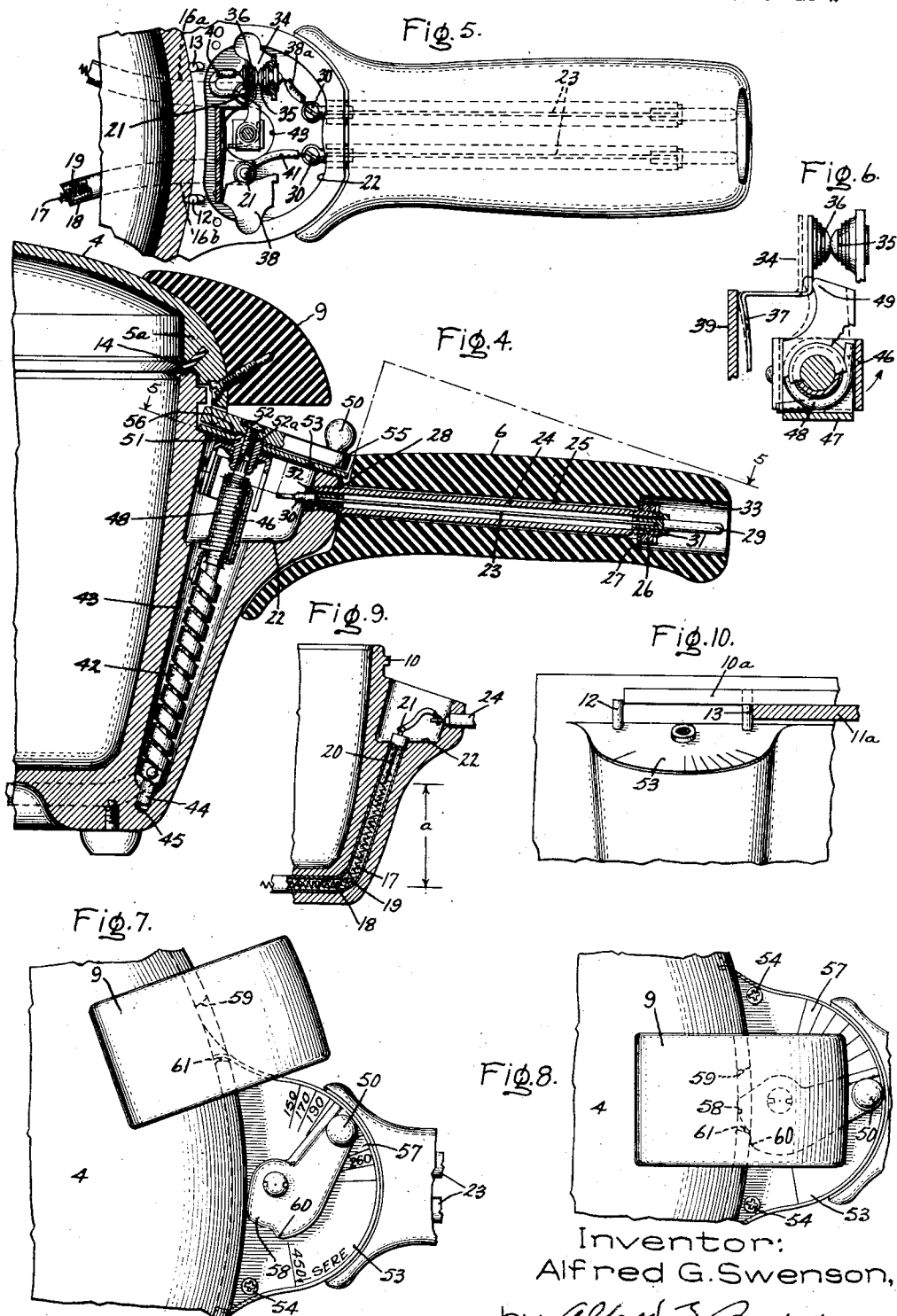
Inventor:
Alfred G. Swenson,
by Alfred V. Bobst
His Attorney.

Patented Oct. 16, 1951

2,571,782

UNITED STATES PATENT OFFICE 2,571,782

COOKER

Alfred G. Swenson, Ontario, Calif., assignor to General Electric Company, a corporation of New York Application May 25, 1946, Serial No. 672,251

9 Claims. (Cl. 219—44)

This invention relates to cookers, more particularly to electrically heated pressure cookers, and it has for its object the provision in a cooker of this character of an improved heater organization and control means therefor.

More specifically, this invention contemplates an improved heater for applying heat to the cooker receptacle, and improved means for controlling the heater responsively to the temperature of the receptacle in order to hold a selected cooking temperature and therefore a corresponding cooking pressure in the receptacle.

The temperature control element is adjustable to vary the temperature held in the receptacle from the lower to the higher temperature limits of a range corresponding to the lower and higher limits of the pressure cooking range, and further is adjustable to a higher temperature range for effecting searing or browning temperatures in the receptacle so that it may be used as an open saucepan to sear and brown edibles.

Safety means are provided which prevent the placing of the cover on the receptacle when the control element is adjusted to the higher searing and browning temperature settings, or is adjusted to the higher temperatures of the pressure cooking range. In other words, the cover may be applied only when the temperature control element is set for the very low temperatures of the pressure cooking range. In addition, the safety means prevents operation of the control element to any temperature controlling position higher than the pressure cooking range once the cover is placed on the receptacle and moved to its closed position.

Other features of this invention reside in improvements of the organization of the heating and temperature control elements and their related controlling switch means for the heater, and also in means for rendering the cooker liquid-proof where the supply leads for the heater enter the cooker and where the adjustable control member for the control element emerges for operation on the outside of the cooker.

For a more complete understanding of this invention, reference should be had to the accompanying drawings in which Fig. 1 is a vertical sectional view taken through an electrically heated pressure cooker embodying this invention; Fig. 2 is a plan view of the cooker shown in Fig. 1, parts being broken away and shown in section so as to illustrate certain structural details; Fig. 3 is a fragmentary view similar to Fig. 2 but illustrating certain of the elements in different operative positions; Fig. 4 is an enlarged fragmentary vertical sectional view taken through a portion of the cooker shown in Figs. 1, 2 and 3; Fig. 5 is a view taken along the line 5—5 of Fig. 4 and looking in the direction of the arrows; Fig. 6 is an enlarged plan view illustrating certain elements of a control switch for the heating means of the cooker; Fig. 7 is a fragmentary plan view of a portion of the cooker; Fig. 8 is a view similar to Fig. 7 but illustrating certain of the elements in other operative positions; Fig. 9 is a fragmentary view illustrating the heater for the pressure cooker and the fashion in which it is arranged with relation to the bottom and side walls of the cooker; and Fig. 10 is a fragmentary elevation of certain elements of the cooker.

Referring to the drawings, this invention has been shown as applied to an electrically heated pressure cooker comprising a cooking receptacle 1 having a bottom wall 2 and an upright side wall 3 extending upwardly from the bottom wall and the two walls defining a cooking vessel in the shape of a saucepan. The walls 2 and 3 preferably will be formed integrally together as by casting, and preferably they will be formed of a suitable, good heat conducting material, such as aluminum. The open top of the receptacle 1 is provided with a cover 4 having a top wall section 5 and a depending side wall section 5a which envelops the upper end portion of the side wall 3 of the receptacle 1.

Attached to the side wall of the receptacle is a handle 6 opposite which is positioned a relatively smaller finger grasping handle 7, and secured to the cover 4 are a pair of oppositely positioned handles 8 and 9.

Suitable means are provided for locking the cover 4 to the receptacle 1 comprising a series of spaced-apart lugs 10 projecting outwardly from the outside surface of the upper end portion of the side wall 3 of the receptacle, and a coacting series of lugs 11 projecting inwardly from the inner surface of the side wall 5a of the cover. It will be understood that the lugs 11 on the cover may be inserted through the spaces between the lugs 10 on the receptacle so as to be brought into a plane below the lugs 10 when the cover is positioned angularly with relation to the receptacle, as shown in Figs. 3 and 7, and that when the cover is then rotated relative to the receptacle to its position of Figs. 2 and 8 so that the handles 8 and 9 of the cover are in alignment with the handles 6 and 7 of the receptacle, the lugs 11 on the cover will be brought underneath the lugs 10 on the receptacle, thereby to prevent the pressure in the receptacle from forcing the cover upwardly away from it. A pair of the lugs 10 of the receptacle positioned opposite each other and designated by the numerals 10a and 10b are relatively elongated, and the spaces between the two sets of contiguous lugs 11 on the cover are correspondingly elongated so that the cover may be passed down to its proper seating position on the receptacle prior to its rotation to its proper closed position shown in Fig. 2 only when it is in its relative angular position shown in Figs. 3 and 7; the two widely spaced cover lugs associated with the right hand receptacle lug 10a are denoted by the numerals 11a and 11b. This arrangement insures the proper seating of the cover on the receptacle. The receptacle is provided with an upright pin 12 which is engaged by the upper edge of the cover lug 11b, as viewed in Fig. 3, to properly position the cover in its preliminary position of Figs. 3 and 7, and a similar upright pin 13 is provided to engage the edge of lug 11a (Fig. 10) to act as a stop for the cover to properly position it in its fully closed position of Figs. 2 and 8.

The cover carries a downwardly projecting sealing ring 14 which engages the upper peripheral edge 15 formed on the upper side wall 3 to pressure seal the cover to the receptacle. The specific cover locking means and sealing means used in the cooker here shown constitute the subject-matter of my copending application, Serial No. 672,250, filed concurrently herewith and assigned to the assignee of the instant application.

The cooking receptacle 1 is heated by means of a sheathed electrical heating element 16 cast within the receptacle walls, and which comprises a helical resistance conductor 17 mounted within a tubular metallic sheath 18 and held in spaced relation with reference to the sheath by an electrically insulating and heat conducting mass 19 formed of any suitable material, such as compacted powdered magnesium oxide. The heater 16 has a substantially circular section within the bottom wall 2 of the receptacle, and its two ends 16a and 16b are brought together at a point underlying the handle 6 and from this point the two ends extend upwardly through the side wall 3 of the receptacle in spaced-apart relation, as more clearly shown in Fig. 5. The resistance conductor 17 extends upwardly in the end sections 16a and 16b for a predetermined distance designated by the letter a in Fig. 9, and at the two upper ends of the conductor are connected suitable terminals 20, the upper ends 21 of which project from the sheath. These terminal ends are received in a suitable well 22 provided in the side wall of the receptacle 3 where the handle 6 is attached. The electrical heater is supplied electrically by means of a pair of leads 23 which enter the cooker through a pair of metallic tubular rods 24 in the handle 6. The handle, as shown, is mounted upon the rods 24 which are passed through apertures 25 provided for them in the handle. The inner ends of these rods are threaded into the side wall of the well 22, as shown, and on their outer ends are threaded suitable nuts 26 which when threaded inwardly abut against a plate 27 so as to clamp the handle 6 to the receptacle. Preferably, a suitable liquid sealing asbestos gasket 28 will be interposed between the inner end of the handle and the receptacle to form a liquid seal at this point. The leads 23 at their outer ends are secured to terminals 29 and at their inner ends are secured to similarly arranged binding posts 30. Surrounding the terminals 29 and the binding posts 30 are tubular insulators 31 and 32 respectively which are tightly wedged between the terminals and connectors and the tubular rods to effect liquid-tight seals. The spaced-apart terminals 29 are located within a suitable socket well 33 provided in the outer end of the handle and into which a suitable plug (not shown) of the well known twin supply conductor may be inserted.

Located within the well 22 is a switch 34 for controlling the energization of the heater, this switch comprising a normally fixed contact 35 and a movable contact 36 which is mounted upon a flexible switch arm 37. The contacts 35 and 36 and the switch arm 37 are mounted upon a suitable bracket 38 mounted in the well, the bracket having a side wall 39 positioned opposite the switch arm 37 and which functions as a stop therefor in its switch open position. As shown more clearly in Fig. 5, the upper supply terminal 29 is connected through its lead 23 and post 30 and a flexible lead 38a with the fixed contact 35, while the movable contact 36 is connected by means of a flexible lead 40 to one terminal 21 of the heater, the opposite terminal 21 of the heater being connected by means of a flexible lead 41 to the other post 30, and thence to the other terminal pin 29 through the other lead 23. By reason of this arrangement when the switch is open the heater is deenergized, whereas when it is closed the heater is energized.

The switch 34 is operated to control the energization of the heater by means of a bimetallic temperature responsive element 42 which responds to the temperature of the receptacle 1. It is wound into a helix, as shown, and which is inserted in a relatively deep recess 43 depending from the bottom of the well 22 and located between the two upright legs of the heater 16a and 16b, as more clearly shown in Fig. 5. This helical member 42 is mounted upon and has its lower end fixed to a rod 44 which has its lower end rotatable in a recess 45 at the bottom of the recess 43, and its upper end projecting out into the well 22, as shown. The upper end of the bimetallic helix is secured to the lower arm of a U-shaped bracket 46, the two legs of which are rotatably mounted upon the rod 44. A similarly shaped bracket 47 is also rotatably mounted upon the upper end of the rod and this bracket 47 is biased into engagement with the bracket 46 by means of a helical torsion spring 48 mounted within the bracket and having its opposite ends bearing against the two brackets respectively to bias them together, all as more clearly shown in Fig. 6. The bracket 47 has a finger extension 49 which is arranged to actuate the movable switch arm 37 to open and close the switch. It will be understood that when the bimetal element heats up it unwinds and thereby moves the bracket 46 with the spring connected bracket 47 counterclockwise, as viewed in Fig. 6, to open the switch at a predetermined high temperature of the bimetal element, and that when the element cools down subsequently it rewinds to move the two elements 46 and 47 together clockwise and thereby permit the switch to close. It should be noted here that the switch arm 37 by its inherent resiliency normally biases the switch closed.

If for any reason the bimetallic helix 42 should tend to move farther in the switch-opening direction after the switch has been opened and the movement of the switch arm 37 limited by the stop 39 then the bracket 46 can move on independently of bracket 47, the spring 48 yielding to permit this motion, and thereby prevent the setting up of abnormal stresses in the bimetallic helix 42.

Attached to the upper end of the rod 44 is a control lever 50 which is located above and outside of the well 22 and which is secured to the upper end of the rod to rotate it when the lever 50 is moved. When this lever is adjusted, it varies the position of the actuator 49 with reference to the switch arm 37 and thereby varies the temperature setting of the control device. The lever, as shown, is secured to the upper end of the rod 44 through a suitable bushing 51 which has its lower end splined to the upper end of the rod 44, and which is secured to the lever through a suitable screw 52, and a shakeproof toothed springlock washer 52a.

A suitable cover plate 53 is provided for the well and is secured thereto in any suitable way as by fastening devices 54 (Figs. 7 and 8), and a liquid-tight seal is effected between the cover and the walls of the receptacle surrounding the well opening by means of a gasket 55 formed of any suitable material, such as asbestos. This cover is provided with an aperture through which the bushing 51 passes and a similar liquid sealing washer 56 surrounds the bushing where it emerges from the cover. A suitable temperature indicating scale 57 marked in degrees, as more clearly shown in Figs. 7 and 8, coacts with the lever 50 to assist in setting the temperature.

It will be understood that each set temperature corresponds to a definite cooking pressure. In the specific example of the invention illustrated, it is contemplated that the pressure temperatures set will vary between 225° and 260° in the normal cooking pressure range. Here, it will be understood that the high temperature of 260° will correspond to a twenty pound pressure, whereas the 225° temperature will correspond to the cooking pressure of about five pounds. Temperature as low as 150° F., however, may be set.

Often times it is desired first to preliminarily brown or seal the edible in a non-pressure cooking operation, and then follow up with a pressure cooking operation. Thus, in cooking pork chops, the chops are first seared with the cover of the cooker off, and then are cooked under pressure with the cover sealed and locked in place. A searing temperature of about 450° is desired and to attain this temperature the lever is adjusted to the 450° setting.

Safety means are provided for preventing the placing of the cover 4 on the cooker in proper covering relation with it if the control lever 50 is in the high temperature range of the pressure cooking range or is in the high temperature searing position beyond the pressure cooking range; and further preventing movement of the lever beyond the 260° temperature limit of the pressure cooking range once the cover is in its proper closing position. In addition, the interlock means prevents operation of the lever to any high temperature position in the event the cover even though seated upon the receptacle is not moved to its locked position therewith, shown in Figs. 2 and 8. This interlock means comprises a protuberance 58 formed on the lever 50 which when the lever is in any position beyond its position corresponding to a temperature of about 190° projects over into the path of movement of the cover to prevent it from moving down to close the receptacle. That is, it will frustrate any attempt to place the cover in sealing relation with the receptacle. However, when the lever is in its 190° position shown in Figs. 3 and 7, the protuberance will clear the cover so that it may be moved down to seat upon the upper edge of the receptacle 3 as shown in Figs. 1 and 7. It will be observed here that in this position the cover is not locked to the receptacle, and that the side wall of the cover will coact with the protuberance 58 to prevent any clockwise adjustment of the lever 50 beyond its 190° position. It is only when the cover has been moved to its locked position of Fig. 8 that the lever can be adjusted to the higher temperature settings in the normal pressure cooking range. This is permitted by means of a slot 59 provided in the side wall of the cover and arranged so that when the cover is in its locked position of Figs. 2 and 8, it will receive the protuberance 58 and thereby permit the lever 50 to be moved to its high temperature 260° setting of the pressure cooking range.

The interlock means, however, prevents movement of the lever beyond this 260° position when the cover is fully closed. This means comprises a seat or abutment 60 provided on the lever and which coacts with the lower edge 61 of the slot, as shown in Figs. 2 and 8 to prevent any further clockwise adjustment of the lever.

It will be observed, therefore, that I have provided electrical heating means, and temperature control means therefore for controlling the heater to provide different cooking pressures, and in addition to provide a high searing temperature. It will be observed also that the safety means provided prevents any dangerous operation of the cooker; it is not possible to operate the cooker at the higher pressure cooking temperatures unless the cover is fully locked in place. And it is impossible to obtain a high searing temperature which would result in a dangerously high pressure in the cooker even though the cover is locked in closing position. In addition, even though the cover is seated upon the receptacle, but not locked thereto, it is not possible to set a high temperature on the control.

One feature of this invention is the refinement in the temperature control effected by causing the heating resistance 17 to extend up the receptacle side wall through the distance indicated a in Fig. 9. This section of the heater functions as a pre-heater for the thermostat. That is, it applies heat substantially directly to the thermostat, in addition to the heat which the thermostat receives from the walls of the receptacle generally, so as to anticipate temperature rise and thereby prevent overshoot.

The cover 4 is provided with a suitable air vent and steam blow-off valve 62 which may have any suitable construction, but preferably a valve will be used such as described and claimed in copending application, Serial No. 672,252, now Patent No. 2,563,563, patented August 7, 1951 filed concurrently herewith, and assigned to the assignee of the instant application.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In a pressure cooker provided with a receptacle and a cover therefor, heating means for heating said receptacle, control means controlling said heating means to hold a substantially constant cooking pressure in said receptacle, a setting element for said control means movable through a range of movement to adjust the setting of the control means so as to hold different preselected substantially constant pressures within a predetermined cooking pressure range, and interlock means between said cover and control element prohibiting the placing of said cover in covering position on said receptacle when said control element is in its higher pressure positions within said range of movement.

2. In a pressure cooker provided with an open-top receptacle and a cover for closing said receptacle, locking means between said cover and receptacle rendered effective by rotating said cover on the receptacle to its closing position, heating means for heating said receptacle, a thermostat responsive to the receptacle temperature controlling said heating means to hold a substantially constant temperature in said receptacle, a temperature adjustment control element for said thermostat movable from a low temperature position through a temperature controlling range to a high temperature position, said range corresponding to a predetermined pressure cooking range, said control element positioned adjacent a wall of said cover and when in the high temperature position of said range having a portion which intercepts said cover to prevent it from being placed upon said receptacle, but permitting free movement of said cover onto said receptacle when said element is in its range below a predetermined low temperature, and coacting means between said portion and said cover providing for unrestricted movement of said control element through said range when said cover is on said receptacle and rotated to its closing position.

3. In a pressure cooker provided with an open-top receptacle and a cover for closing said receptacle, locking means between said cover and receptacle rendered effective by rotating said cover on the receptacle to its closing position, heating means for heating said receptacle, a thermostat responsive to the receptacle temperature controlling said heating means and holding a substantially constant temperature in said receptacle, a temperature adjustment control element for said thermostat movable from a low temperature position through a temperature controlling range to a high temperature position, said range corresponding to a predetermined pressure cooking range, said control element positioned adjacent a wall of said cover and when in said high temperature position of said range having a portion which projects inwardly to intercept said cover to prevent it from being placed upon said receptacle but permitting free movement of said cover onto said receptacle when said element is in its range below a predetermined low temperature, and a slot in said cover which is positioned opposite said projection when said cover is rotated to said closing position for receiving the projection and thereby permitting unrestricted movement of said control element throughout said temperature range.

4. In a pressure cooker provided with an open-top receptacle and a cover for closing said receptacle, locking means between said cover and receptacle rendered effective by rotating said cover from one position on said receptacle to a second position thereon which is the proper cooking position of the cover, heating means for heating said receptacle, a thermostat responsive to the receptacle temperature controlling said heating means to hold a substantially constant temperature in said receptacle, a temperature adjustment control element for said thermostat movable from the low temperature position of a predetermined temperature range to the high temperature position thereof, said range corresponding to a predetermined pressure cooking range, said control element positioned adjacent a wall of said cover and when in said high temperature position of said range having a portion which intercepts said cover to prevent it from being placed upon said receptacle into said one position, but permitting free movement of said cover to said one position when said element is in its range below a predetermined low temperature, and said cover when in said one position preventing the operation of said control element to the higher temperatures of said cooking range, and coacting means between said portion and said cover providing for unrestricted movement of said control element through said range when said cover is rotated to said second position.

5. In a pressure cooker provided with a receptacle and a cover therefor, heating means for heating said receptacle, a thermostat responsive to the receptacle temperature controlling said heating means to hold a predetermined temperature corresponding to a predetermined pressure in said receptacle, a temperature adjustment control element for said thermostat movable through a range of movement to adjust the temperature setting of said thermostat to hold a preselected temperature within a predetermined range corresponding to a predetermined pressure cooking range, and further shiftable to an extreme high temperature position beyond said cooking range, and interlocking means between said cover and said control element operative to limit the movement of said element at the high temperature end of said pressure cooking temperature range when said cover is in its proper covering position with respect to said receptacle.

6. In a pressure cooker provided with an open-top receptacle and a cover for closing said receptacle, locking means between said cover and receptacle rendered effective by rotating said cover on the receptacle to its cooking position, heating means for heating said receptacle, a thermostat responsive to the receptacle temperature controlling said heating means and holding a substantially constant temperature in said receptacle, a temperature adjustment control element for said thermostat movable from a low temperature position through a temperature controlling range to a high temperature position, said range corresponding to a predetermined pressure cooking range, and further shiftable to a higher temperature range beyond said pressure cooking range to effect searing heats and the like, said control element having a portion positioned adjacent a wall of said cover so that when said control element is in the high temperature end of said pressure cooking range or in said higher temperature searing range it intercepts said cover to prevent it from being placed upon said receptacle, but permits free movement of said cover to cover said receptacle when said control element is in its temperature range below a predetermined low temperature of said pressure cooking range, and coacting means between said portion and said cover providing for unrestricted movement of said control element only through said pressure cooking range when said cover is on said receptacle and rotated to its cooking position.

7. In a pressure cooker provided with an open-top receptacle and a cover for closing said receptacle, locking means between said cover and receptacle rendered effective by rotating said cover on the receptacle to its cooking position, heating means for heating said receptacle, a thermostat responsive to the receptacle temperature controlling said heating means and holding a substantially constant temperature in said receptacle, a temperature adjustment control element for said thermostat movable from a low temperature position through a temperature controlling range to a high temperature position, said range corresponding to a predetermined pressure cooking range, and further shiftable through a higher temperature range beyond said pressure cooking range to effect searing heats, said control element having a portion positioned adjacent a wall of said cover so that when said control element is in the high temperature end of said pressure cooking range or in said higher temperature searing range it intercepts said cover to prevent it from being placed upon said receptacle in closing relation with it, but permits free movement of said cover to close said receptacle when said control element is in its temperature range below a predetermined low temperature of said pressure cooking range, and a slot in said cover which is positioned opposite said portion of said control element when said cover is rotated to its proper cooking position for receiving said portion to permit unrestricted movement of said control element only through said pressure cooking range, an edge of said slot functioning as a stop to prevent movement of said control element into said high temperature searing range.

8. A pressure cooker and the like comprising a receptacle provided with a bottom wall and a side wall extending upwardly therefrom to define an open top, a cover sealing said top, said walls being cast integrally together, a heating element cast to said bottom wall exteriorly of its inner surface and having a heating section extending upwardly integrally within said side wall, a thermostatic element within said side wall controlling said heating element responsively to the temperature of said side wall and also located to respond locally to the temperature of said heating section in said side wall, which heating section thereby functions as a thermostat preheater to anticipate temperature rise in said cooker and thereby prevent temperature overshoot therein.

9. A pressure cooker and the like comprising a receptacle provided with a bottom wall and a side wall extending upwardly therefrom to define an open top, a cover sealing said top, said walls being cast integrally together, an enclosed heating element cast into said bottom wall and having end heating sections adjacent each other cast within and extending upwardly in said side wall exteriorly of its inner surface, terminals at said end portions, the upper part of said side wall being provided with a well exteriorly of its inner surface into which said terminals project, a thermostatic element, said well having depending therefrom an elongated recess adjacent said heating sections and in which said thermostatic element is received for response to temperature within said receptacle and anticipatory response from proximity to said end heating sections, a switch in said well operated by said thermostatic element connected in the energizing circuit of said heater for controlling its energization, supply leads for said heating element entering said well, and means for effecting a liquid-tight covering seal for said well and for effecting a liquid-tight seal for said leads.

ALFRED G. SWENSON.

REFERENCES CITED

The following references are of record in the file of this patent:

UNITED STATES PATENTS

| Number | Name | Date |
| --- | --- | --- |
| 1,155,166 | Rose | Sept. 28, 1915 |
| 1,804,130 | Starr | May 5, 1931 |
| 1,946,220 | Lotz | Feb. 6, 1934 |
| 2,194,117 | Graham | Mar. 19, 1940 |
| 2,212,100 | Keaton | Aug. 20, 1940 |
| 2,286,470 | Dafform et al. | June 16, 1942 |
| 2,312,349 | Malone | Mar. 2, 1943 |
| 2,318,699 | McCabe | May 11, 1943 |
| 2,422,974 | Newell | June 24, 1947 |
| 2,428,642 | Weeks | Oct. 7, 1947 |
| 2,440,128 | Sullivan | Apr. 20, 1948 |
| 2,471,259 | Chapman | May 24, 1949 |
| 2,471,260 | Chapman | May 24, 1949 |